US008274495B2

(12) United States Patent
Lee

(10) Patent No.: US 8,274,495 B2
(45) Date of Patent: Sep. 25, 2012

(54) SYSTEM AND METHOD FOR CONTACTLESS TOUCH SCREEN

(75) Inventor: Yee Chun Lee, San Jose, CA (US)

(73) Assignee: General Display, Ltd., San Jose, CA (US)

(*) Notice: Subject to any disclaimer, the term of this patent is extended or adjusted under 35 U.S.C. 154(b) by 301 days.

(21) Appl. No.: 12/787,340

(22) Filed: May 25, 2010

(65) Prior Publication Data
US 2011/0291989 A1 Dec. 1, 2011

(51) Int. Cl.
G06F 3/042 (2006.01)
(52) U.S. Cl. ............. 345/175; 356/614; 178/18.09; 359/559
(58) Field of Classification Search .......... 345/173–184; 178/18.01–19.04; 359/558–576; 356/604, 356/614–624; 250/237 G
See application file for complete search history.

(56) References Cited

U.S. PATENT DOCUMENTS
7,435,940 B2 * 10/2008 Eliasson et al. ............... 250/221
2005/0007603 A1 * 1/2005 Arieli et al. .................. 356/601
* cited by examiner Primary Examiner — Liliana Cerullo
(74) Attorney, Agent, or Firm — Greenber Traurig, LLP

(57) ABSTRACT

A touch screen that employs a lens-less linear IR sensor array and an IR light source from a single location at the periphery of the screen to illuminate one or more objects proximate to the screen surface and detect light reflected from such objects. The sensor array is paired with a proximal grid-like barrier/reflector to create Moiré patterns on the sensor array. Digital signal processing converts such patterns into discrete Fourier transforms. The peaks of the lower order discrete Fourier spectrum as well as the complex phases of the lower order peaks can be used to determine the locations of the objects proximal to the screen accurately. A small number of pressure or surface acoustic sensors at the periphery of the screen are utilized to improve positioning reliability by providing redundant positioning information and registering physical contacts with the screen.

16 Claims, 8 Drawing Sheets

SYSTEM AND METHOD FOR CONTACTLESS TOUCH SCREEN

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to touch sensitive screens and, more particularly, to IR based proximal object illumination sensing and position determination.

BACKGROUND OF THE INVENTION

Touch screen technologies can be broadly classified into six main categories: resistive, capacitive, peripheral IR, ultrasound, optical imaging, and surface acoustic/pressure. Among those, only resistive, capacitive and optical imaging technologies can readily support multi-touch touch screen capabilities. Although resistive touch screen technology has been the most commonly used technology for small interactive displays due to its relatively low cost, capacitive touch screen technology has been gaining popularity because of its superior touch sensitivity that allows easy and fluid on-screen navigation at the slightest touch.

Both resistive and capacitive touch screens require layered touch sensitive overlays on the display surface and peripheral driver/controllers to process positioning information that increase manufacturing cost and reduce light transmission and image clarity requiring a corresponding increase in the display light output to compensate. Capacitive touch screens have more complex layered substrate structures that are harder to manufacture, thus making it a far more expensive touch technology to implement. Capacitive touch screen also requires the presence of human fingers or something with similar electrical characteristics. Gloved finger or stylus will not work on a capacitive touch screen.

Optical imaging touch screen typically utilizes the principle of frustrated total internal reflection with edge illuminated light trapped within the face glass, released only with a touch of a finger, and one or more cameras capturing the light escaping the glass to determine finger locations. Such an approach requires significant space between the cameras and the screen in order for it to operate properly, making it unsuitable for portable display devices where space is a premium. Other approaches such as ultrasound are even more expensive to implement or are unable to be hermetically sealed to block out dust and moisture, making them generally unsuitable for mobile device applications.

The two main touch screen technologies, resistive and capacitive, have additional drawbacks. Both have relatively low touch resolution in real world implementations as the cost of manufacturing goes up sharply with resolution and concomitantly the touch sensitivity drops precipitously since the sensitivity is directly proportional to the physical dimensions of the individual touch sensors. A more serious issue with both touch technologies is the fact that the position of an object or objects can only be determined after such object make physical contact with the touch screen.

Such deficiencies make many of the gesture-based operations awkward to execute. For example, typing on a virtual keyboard on the touch screen requires the finger to be directly on top of the virtual key to be pressed. Unless the touch screen is large, the virtual key is usually far smaller than the finger itself, hence hitting the right key can be difficult. Such a user interface could be improved if the touch screen can provide a blown up view of the virtual keys underneath the finger and/or the finger itself before the finger touches the screen. Such an interface would require, however, detection of the user's finger before it touches the screen.

Other gestures, such as pinch, zoom, and swipe, also require continuous physical contact between the finger or fingers and the touch screen in order for the touch screen to track the motion of the fingers. This creates wear and tear on the physical screen of devices, degrading the performance of the screen with time. It also makes it hard for the device to ascertain the intention of the user if the latter fails to maintain the physical contact continuously during the gesturing period.

SUMMARY OF THE INVENTION

In one embodiment, the invention is a touch screen that employs a lens-less linear IR sensor array and an IR light source from a single location at the periphery of the screen to illuminate one or more objects proximate to the screen surface and detect light reflected from such objects. The sensor array is paired with a proximal grid-like barrier/reflector to create Moiré patterns on the sensor array. Digital signal processing converts such patterns into discrete Fourier transforms. The peaks of the lower order discrete Fourier spectrum as well as the complex phases of the lower order peaks can be used to determine the locations of the objects proximal to the screen accurately. A small number of pressure or surface acoustic sensors at the periphery of the screen are utilized to improve positioning reliability by providing redundant positioning information and registering physical contacts with the screen. By providing both pre-touch positioning information and actual touch locations, touch-based operations such as virtual keying and gesture input are enhanced. The absence of additional layered touch sensitive resistive or capacitive substrates improves light transmission and image clarity.

BRIEF DESCRIPTION OF THE DRAWINGS

The foregoing and other objects, features, and advantages of the invention will be apparent from the following more particular description of embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
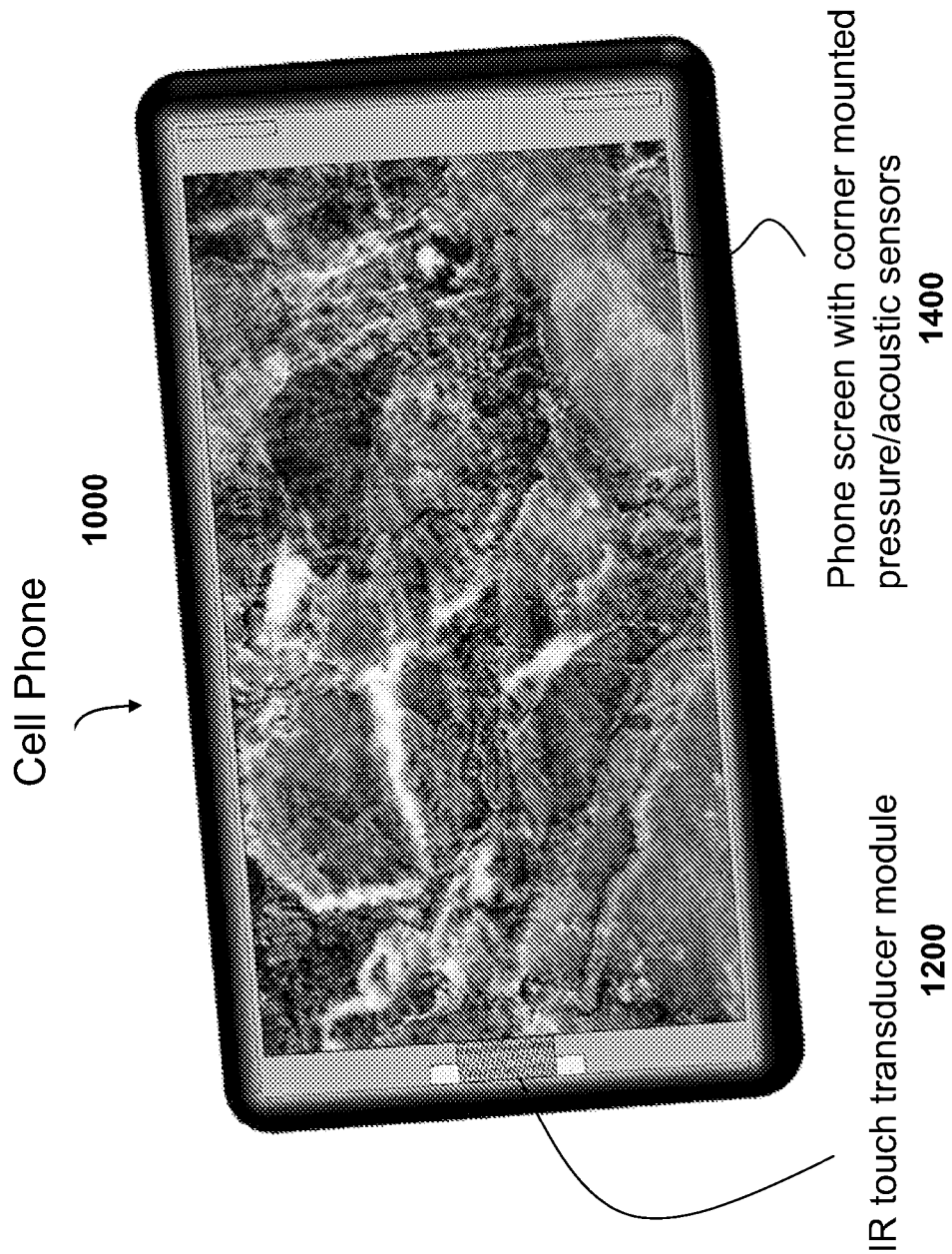
FIG. 1 is a perspective view of an assembled cell phone with bezel mounted IR touch transducer module and protective display glass panel with corner mounted pressure/acoustic sensors.

For the purposes of this disclosure, a computer readable medium stores computer data in machine readable form. By way of example, and not limitation, a computer readable medium can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other mass storage devices, or any other medium which can be used to store the desired information and which can be accessed by the computer.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may grouped into an engine or an application.

Various embodiments of touch screens described below provide capabilities to detect the proximity of a user's finger or other object near the screen before the object touches the screen, and provide further capabilities to detect the actual contact of such objects with the screen.

These capabilities allow a user to finger gesture with or without physically touching the screen. Such a gesture can then be interpreted when the user actually touches the screen. For example, in one embodiment, a user could cause the display of one or more commands on a touch screen using a finger gesture and could then cause the execution of the one or more of the commands with a final tapping of the touch screen. By separating the tracking phase where the object or objects are tracked as they are within a few millimeters from the touch surface and the execution phase where the touch controller senses an abrupt high frequency acoustic impulse that comes with tapping on the screen, gestures operation can be more accurately and consistently interpreted.

Such a two-phased approach also makes it possible to enable a more intuitive interface for certain graphical applications. For example, to read an online newspaper, the proximal movement of the user's finger can be tracked even without touching to cause the content of the paper to move sympathetically to allow the user to scan the page. The location of the finger can also elicit a magnifying glass to enlarge the content of the page right around where the finger is pointing to overcome limited screen resolution on small display screens on mobile devices that do not permit the display of the entire content of a full page without shrinking it. Once the desired content location is found, a slight tapping of the screen pins the fully magnified content down for viewing by the user.

In one embodiment, the disclosed device can use two distinct touch sensing subsystems; one that is non-contact IR based, and the other based on strain gauge or pressure gauge. FIG. 1 illustrates one embodiment of a cell phone 1000 that provides both an IR touch transducer module 1200 and a screen with corner mounted pressure/acoustic sensors 1400. The device further includes one or more low power microcontrollers or core based controllers (not shown) for, inter alia, processing and interpreting data received from the IR touch transducer module 1200 and the corner mounted pressure/acoustic sensors 1400.

The use of both an IR touch transducer module 1200 and a screen with corner mounted pressure/acoustic sensors 1400 improves the accuracy and reliability of the system. By providing both pre-touch positioning information and actual touch locations, touch-based operations such as virtual keying and gesture input are enhanced by enabling the user to see the precise location of the typing finger before the finger hits the screen, thereby allowing the user to make pre-touch course correction to ensure the right virtual key will be hit. This can improve typing speed and accuracy since the user does not need to predict where the user's finger will land on the screen even if the desired virtual key is obscured when the user's finger is about to hit the screen.

Note that light transmission efficiency and image clarity of the device also benefit from the lack of transparent electrode layers that obstruct light as well as the multiple interfaces bridging different substrates that cause multiple internal reflections with consequent transmission losses.

Figure 2:
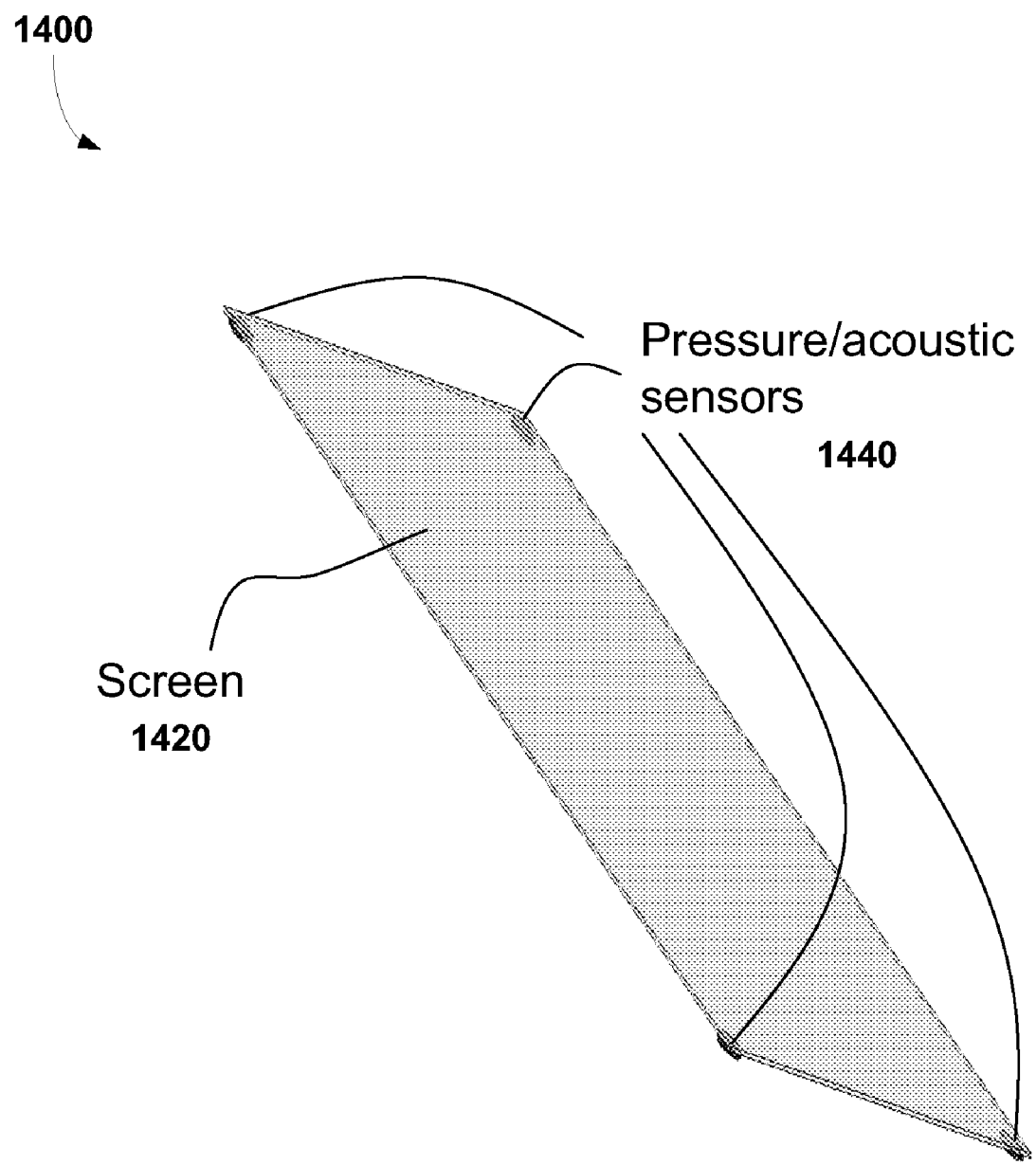
FIG. 2 is a perspective view of the protective screen cover glass with corner mounted pressure/acoustic sensors as a part of a two-phase commit touch gesture sensing subsystem.

The components and operating principles of one embodiment of the disclosed device will now be discussed in more detail. FIG. 2 provides a perspective view of one embodiment of a screen with corner mounted pressure/acoustic sensors 1400. A protective screen cover glass 1420 is provided with corner-mounted strain gauges 1440, such as pressure/acoustic sensors. The protective glass or hard plastic panel 1420 can be spring-mounted on the four corners of the panel. The strain gauges 1440 can be used to determine the deflection at each corner when the panel is touched. The spring-mounting component can be embedded directly into the strain gauge 1440 by encasing the strain gauge with elastic substrate with elasticity that is approximately equal to, but slightly lower than that of the strain gauge itself.

If the spring-mounting component is too soft, most of the mechanical load will be borne by the strain gauge itself, whereas if the elasticity is too high, then the sensitivity of the strain gauge will be greatly reduced as the gauge shares only a small portion of the deflection load. In one embodiment, the strain gauge can be configured as both a pressure gauge and an acoustic sensor. The embodiment described above responds well to high frequency impulse like touches such as a light tapping on the protective panel.

For a single touch, the position of the touch location can be estimated by performing a bilinear interpolation of the strain gauge values. For multi-touch, the bilinear interpolation can only give the weighted centroid of the multiple touch points. However, when working in conjunction with an IR touch transducer module, such as that of FIG. 1, 1200, the device can improve the reliability of the single touch positioning and provide a consistency check of the output of the IR module in multi-touch situations. Depending on the touch interface design and specific application, the touch sensitivity threshold of the peripheral pressure or acoustic sensors can be adjusted accordingly.

The strain gauge panel can further be used to detect that a physical contact with the screen has been made through either its pressure signature or the acoustic signature to complement IR position sensing which does not actually sense touch, and instead only senses the presence of one or more objects proximal to the screen surface. Having both a non-contact way to detect touch and a contact way to detect touch allows fingers (or other objects such as a stylus) to be tracked prior to actual contact to enable two phase commit to improve pointing accuracy and usability.

In one embodiment, the IR technology used in the IR touch transducer module 1200 employs a lens-less linear IR sensor array and an IR light source from a single location at the periphery of the screen to illuminate one or more objects proximate to the screen surface and detect light reflected from such objects. In one embodiment, the disclosed device uses Moiré interferometry created by the interplay between a corrugated mirror, a periodic grating or other proximal grid-like barrier and/or reflector and an IR sensor pixel array where the pixel pitch and the corrugated mesh size of the mirror or the mesh size of the periodic grating is nearly the same.

The Moiré pattern so formed is captured by the sensor array and pre-conditioned and further processed by a digital processing controller. The ideal Moiré pattern thus formed is a sine wave with superposed high frequency modulations for each time the screen is touched. The resulting Fourier spectrum contains sharp peaks in the lower order part of the spectrum that provide radial positioning information, and at the same time the azimuthal positioning information is contained entirely within the complex phases of the individual lower order Fourier spectrum peaks.

In one embodiment, after preconditioning, digital signal processing converts such Moiré patterns into a set of discrete Fourier transform coefficients. Once the transform coefficients have been obtained, higher order coefficients can be discarded and peak finders are used to locate all low order Fourier coefficients. The peaks of the lower order discrete Fourier spectrum and the associated complex phases can be used to determine the locations of the objects proximal to the screen through an iterative approach of using the lowest order peak and its associated phase for coarse positioning and progressively refining the positioning by taking into account higher order peaks using the method of successive approximation. Using a single edge location for both IR illumination and capture can greatly simplify the design as well as reduce manufacturing cost for devices implementing principles of this disclosure.

Figure 3:
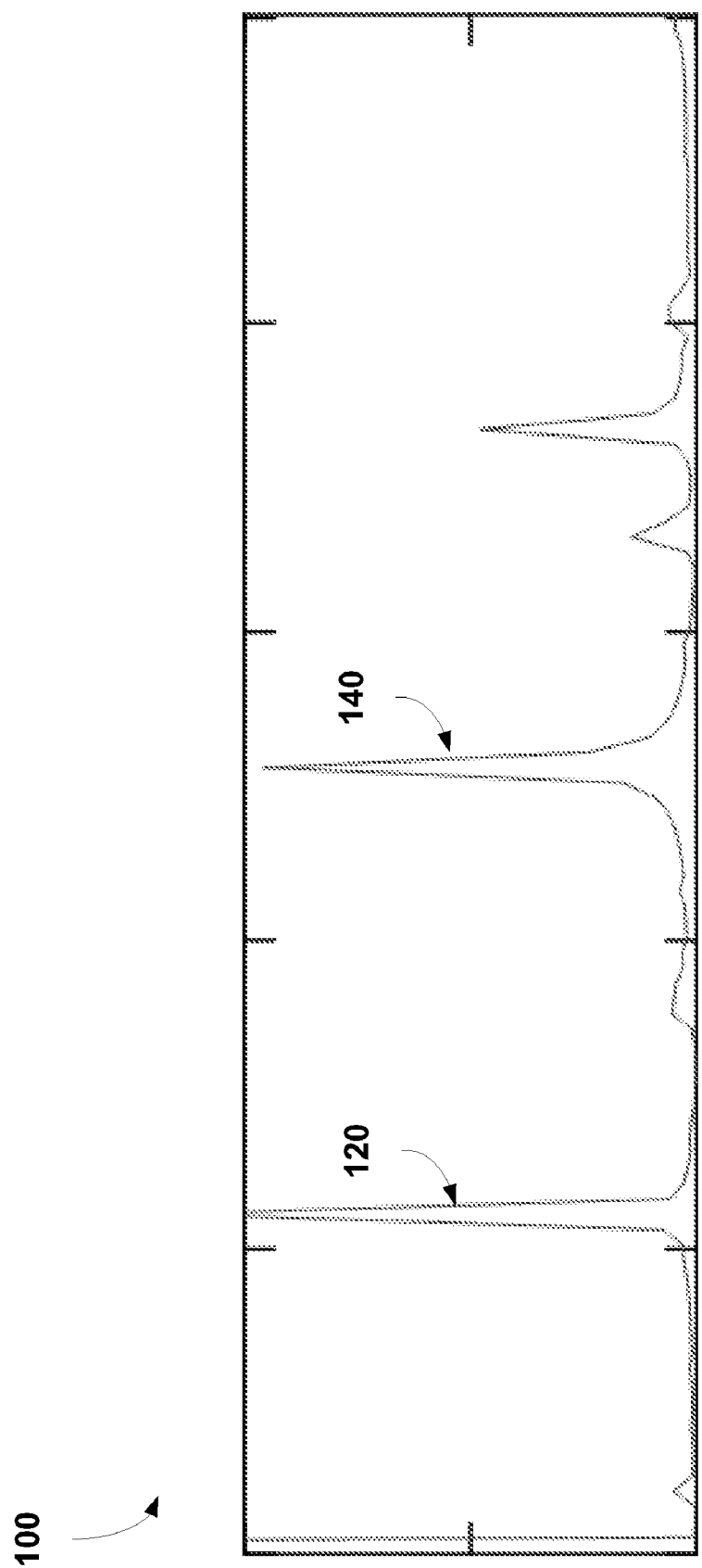
FIG. 3 provides an illustrative graph that shows the discrete Fourier spectrum obtained from received and processed IR data from two objects proximal to a display screen that produce two distinct peaks representing the two proximal objects.
Figure 4:
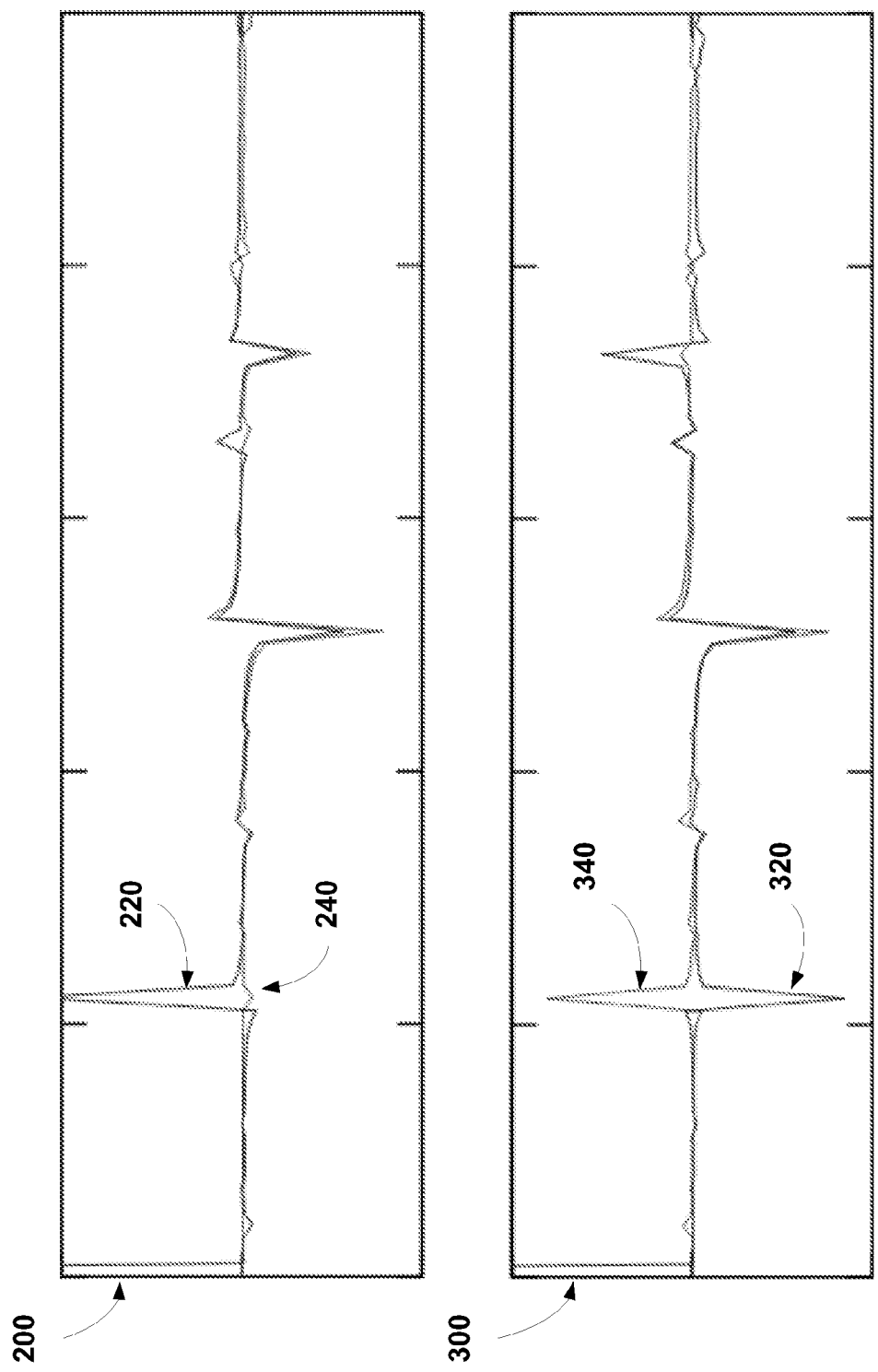
FIG. 4 provides two illustrative graphs that show the discrete complex Fourier coefficients obtained from the received and processed IR data relating to two objects proximal to a display screen having identical radial locations but different azimuthal locations.

FIG. 3 provides an illustrative graph 100 that shows the discrete Fourier spectrum obtained from received and processed IR data from two objects proximal to a display screen (e.g. a multitouch user interface action) that produce two distinct peaks 120 and 140 representing the two proximal objects. FIG. 4 provides illustrative graphs 200 and 300 which show the discrete complex Fourier coefficients obtained from the received and processed IR data relating to two objects proximal to a display screen having identical radial locations but different azimuthal locations The peaks in the lower order part of the spectrum 220 and 320 provide radial positioning information, the complex phases of the individual lower order Fourier spectrum 240 and 340 provide azimuthal positioning information.

The clean separation between the radial and azimuthal information allows the location estimation to be conducted with greatly reduced algorithmic complexity. For typical display resolution of a small device such as a smart phone this permits, in one embodiment, the discrete Fourier transform to be pre-computed and stored as a one-dimensional lookup table mapping spectrum peaks to touch locations, thereby enabling a low power microcontroller to be used in place of a digital signal processing core based controller, further reducing the cost of the device.

Figure 5:
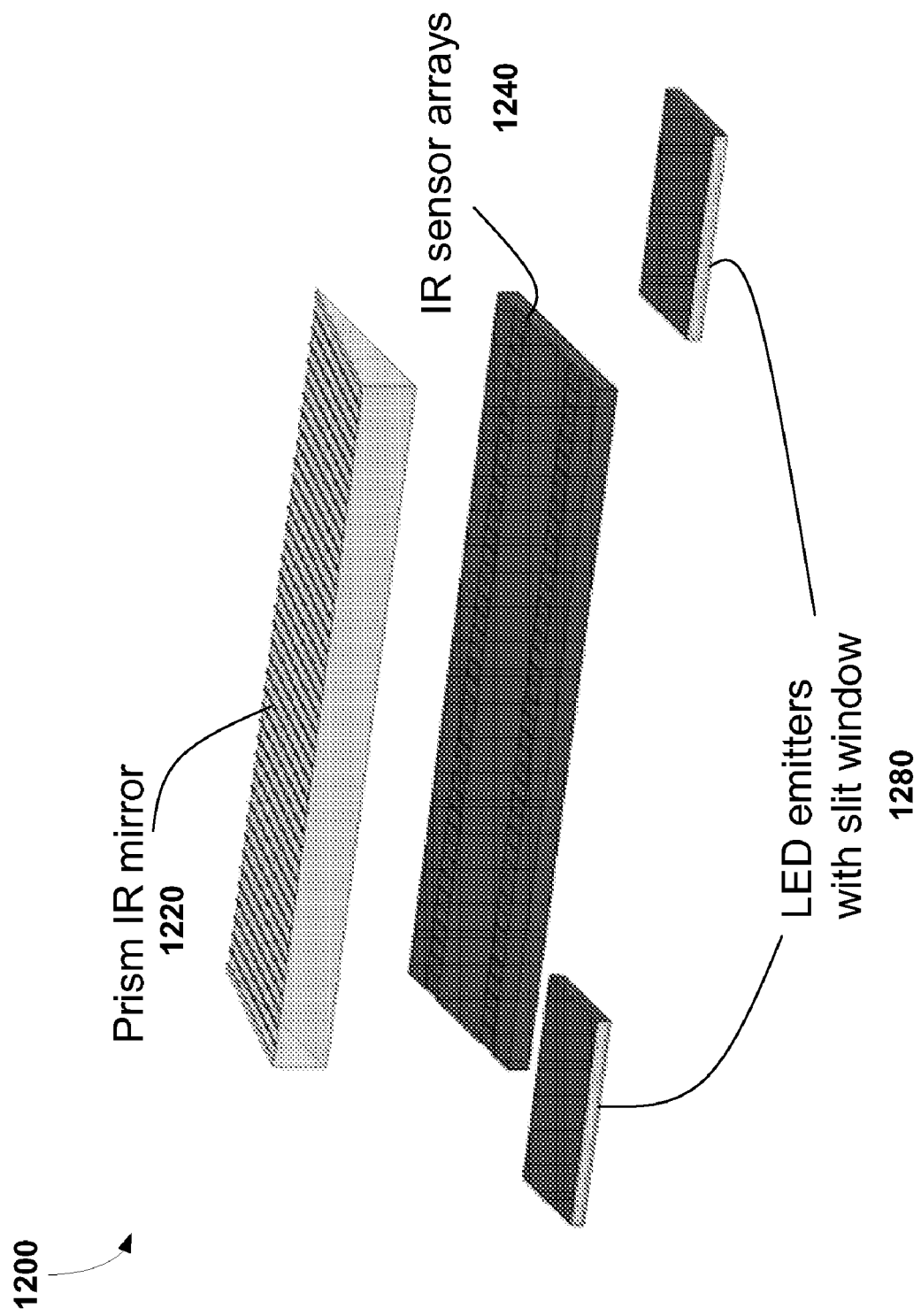
FIG. 5 is a perspective exploded view of an IR touch transducer module with a prism IR mirror, center IR sensor arrays and flanking LED IR emitters with slit windows.
Figure 6:
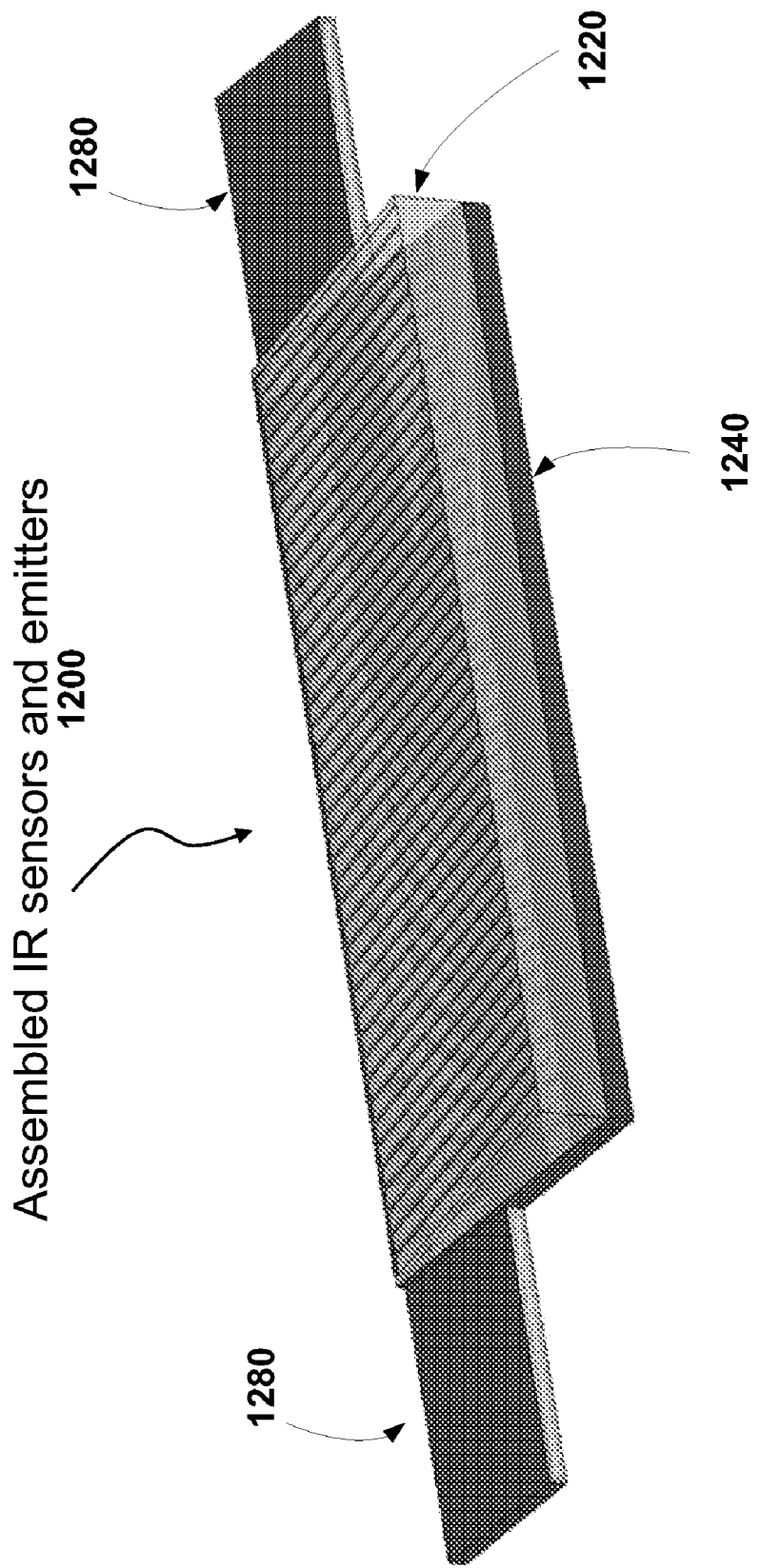
FIG. 6 presents the IR touch transducer module of FIG. 5 as it appears assembled in a functioning device.

FIG. 5 is a perspective exploded view of an IR touch transducer module 1200 with a prism IR mirror 1220, center IR sensor arrays 1240 and flanking LED IR emitters with slit windows 1280. FIG. 6 presents the IR touch transducer module 1200 of FIG. 5 as it appears assembled in a functioning device with a prism IR mirror 1220, center IR sensor arrays 1240 and flanking LED IR emitters with slit windows 1280.

Figure 7:
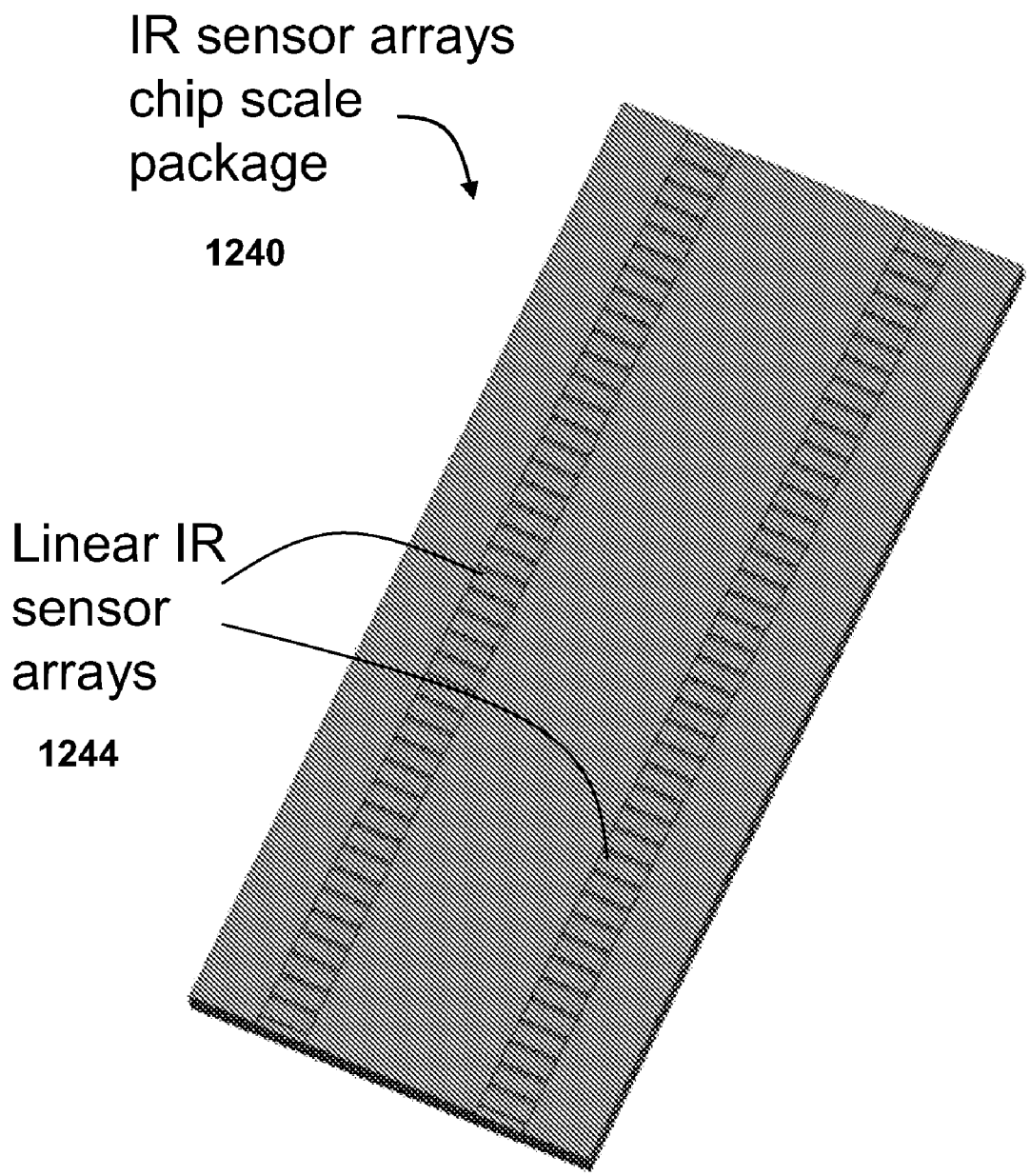
FIG. 7 is a perspective view of an IR sensor array in a chip scale package with two linear sensor arrays shown.
Figure 8:
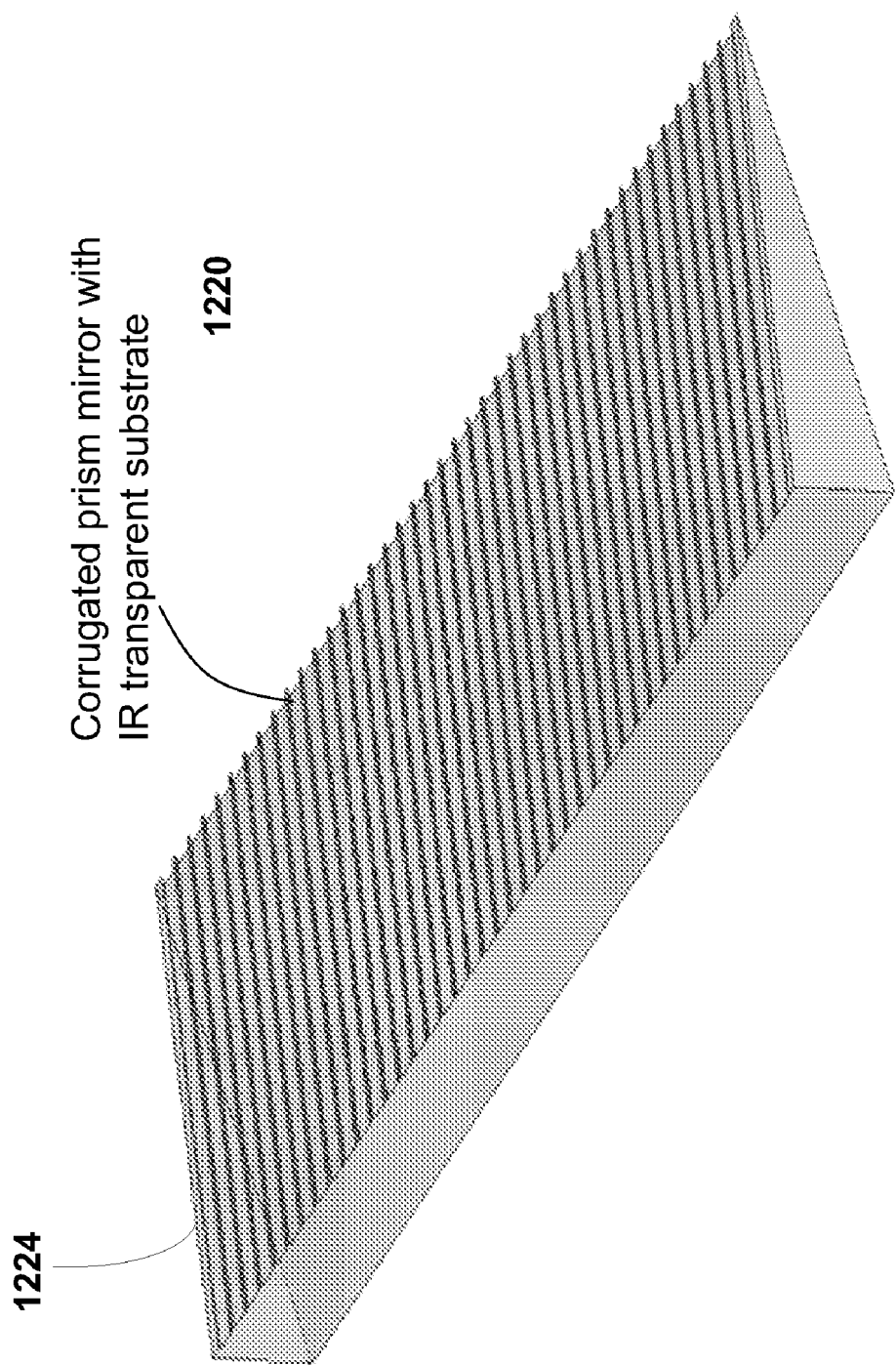
FIG. 8 shows one embodiment of a corrugated prism mirror in the shape of a triangular wedge made of IR transparent material, with the inclined mirror face etched into a corrugated periodic pattern whose periodicity closely matches the pitch of an IR sensor array.

The center IR sensor arrays 1240 can be packaged in a chip scale package comprising two or more linear IR sensor arrays 1244 as shown in FIG. 7. FIG. 8 shows one embodiment of a corrugated prism mirror 1220 in the shape of a triangular wedge made of IR transparent material with an inclined mirror face 1224 etched into a corrugated periodic pattern whose periodicity closely matches the pitch of the IR sensor array shown in FIG. 7. The corrugated mirror redirects the incoming IR light toward the IR array to expose the IR sensors to the modulated IR radiation. The modulation of the IR is caused by the random scattering of the IR light away from the sensor array or arrays.

Alternatively, the inclined mirror face 1224 can be patterned with a periodically arranged grid of IR absorbing paint or ink. The sensor array periodically samples the modulated IR light directed at it, and if the period of the modulated IR light is nearly equal to the pitch of the sensor array, then the sampled IR light will exhibit the characteristic Moiré pattern.

The IR touch transducer module 1200 detects the presence of proximal objects whether the objects in question have any physical contact with the touch surface or not, whereas the pressure/acoustic sensors 1400 only detect contacts which generate sufficient pressure or surface acoustic signature which exceeds the touch sensitivity threshold. Thus, using the combination, the touch screen can differentiate two distinct classes of touch signals, one is registered by the IR sensor array to indicate the proximal presence of an object that has not yet been registered by the pressure/acoustic sensors, and the second class contains touch signals which are registered by both types of sensors.

In one embodiment the pressure/acoustic sensitivity threshold of the device is set relatively high. When the pressure/acoustic sensitivity threshold is set low, no distinction is made to differentiate the first class of touch signal from that of the second class, for if such a distinction is made, then there would be too many occurrences of false positives and false negatives, thus making gesture recognition unreliable. On the other hand, when the pressure/acoustic sensitivity threshold is set high, as in the case when only heavy touching or tapping can cause the signal to exceed pressure or acoustic sensitivity, then the two classes of touch signals can be reliably distinguished.

The device thus disclosed permits "pre-touch" tracking of fingers to cause sympathetic viewpoint changes in preparation for the commitment or abortion of a pending transaction without triggering any real transaction. The second "commit" phase is where a tapping or a short hard press on the touch surface within a preset time span can trigger the desired transaction, and the absence of the same signal within the allotted time causes the said transaction to be aborted. Such a two phased gesturing can enhance the reliability of the touch interface since it diminishes the probability of false triggering and is more intuitive at the same time.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A device comprising:
   a display screen;
   an infrared light source at a periphery of the screen adapted to illuminate objects proximate to the screen surface;
   an infrared sensor array adapted to detect light reflected from the objects proximate to the screen surface;
   a proximal barrier adapted to create Moiré patterns on the infrared sensor array using infrared light reflected from the objects proximate to the screen surface;
   a processing module adapted to convert the Moiré patterns into a discrete Fourier spectrum, wherein peaks of a lower order discrete Fourier spectrum and complex phases of the peaks of the lower order discrete Fourier spectrum are used to determine the location of the objects proximal to the screen; and
   a plurality of strain gauges at the periphery of the display screen adapted to detect physical contact of the objects with the display screen,
   wherein the peaks in the lower order part of the spectrum provide radial positioning information for objects proximate to the screen surface, and the complex phases of the lower order Fourier spectrum peaks provide azimuthal positioning information for such objects.

2. The device of claim 1 wherein the Moiré patterns comprise a sine wave with superposed high frequency modulations for each time an object is proximate to the screen surface.

3. The device of claim 1 wherein the process of using the peaks of the low order discrete Fourier spectrum and the associated complex phases to determine the locations of the objects proximal to the screen is performed using an iterative approach wherein a lowest order peak and its associated complex phase are used for coarse positioning and wherein the positioning is progressively refined by taking into account higher order peaks using a process of successive approximation.

4. The device of claim 1 wherein the process of converting Moiré patterns into a discrete Fourier spectrum comprises:
   converting the Moiré patterns into a set of discrete Fourier transform coefficients;
   discarding higher order coefficients from the set of discrete Fourier transform coefficients; and
   locating all low order Fourier coefficients in the set of discrete Fourier transform coefficients.

5. The device of claim 4 wherein the set of discrete Fourier transform coefficients are pre-computed and stored as a one-dimensional lookup table mapping spectrum peaks, the one-dimensional lookup table being stored on a computer-readable medium operatively connected to the processing module.

6. The device of claim 1 wherein the proximal barrier is a corrugated mirror wherein a pixel pitch and a corrugated mesh size of the corrugated mirror is nearly the same as a pixel pitch and a corrugated mesh size of the infrared sensor array.

7. The device of claim 1 wherein the proximal barrier is a periodic grating, wherein a pixel pitch and a corrugated mesh size of the periodic grating is nearly the same as a pixel pitch and a corrugated mesh size of the infrared sensor array.

8. The device of claim 1 wherein the processing module is further adapted to determine at least one touch location for the physical contact of the objects with the display screen using data generated by the plurality of strain gauges.

9. The device of claim 8 wherein the at least one touch location is a single touch location and a position of the touch location is estimated by performing a bilinear interpolation of the data generated by the plurality of strain gauges.

10. The device of claim 8 wherein the at least one touch location is at least two touch locations and bilinear interpolation gives the weighted centroid of the at least two touch locations.

11. The device of claim 8 wherein the at least one touch location is used to verify the accuracy of the location of the objects proximal to the screen determined using infrared sensor array data.

12. The device of claim 1 wherein the plurality of strain gauges have pressure-sensing capabilities.

13. The device of claim 1 wherein the plurality of strain gauges have acoustic-sensing capabilities.

14. A non-transitory computer-readable medium having computer-executable instructions for a method comprising:
   illuminating, using an infrared light source, objects proximate to a screen surface;
   creating Moiré patterns, using a proximal barrier, using infrared light reflected from the objects proximate to the screen surface;
   receiving, using an infrared sensor array, the Moiré patterns;
   converting, using a processing module, the Moiré patterns into a discrete Fourier spectrum; and determining, using the processing module, locations of the objects proximal to the screen, wherein the location of the objects are determined using peaks of a lower order discrete Fourier spectrum and complex phases of the peaks of the lower order discrete Fourier spectrum, wherein the peaks in the lower order part of the spectrum provide radial positioning information for objects proximate to the screen surface, and the complex phases of the individual lower order Fourier spectrum peaks provide azimuthal positioning information for such objects.

15. The computer-readable medium of claim 14 wherein the process of using the peaks of the lower order discrete Fourier spectrum and the associated complex phases to determine the locations of the objects proximal to the screen is performed using an iterative approach wherein a lowest order peak and its associated complex phase are used for coarse positioning and wherein the positioning is progressively refined by taking into account higher order peaks using a process of successive approximation.

16. The computer-readable medium of claim 14 wherein the process of converting Moiré patterns into a discrete Fourier spectrum comprises:

converting the Moiré patterns into a set of discrete Fourier transform coefficients;

discarding higher order coefficients; and locating all low order Fourier coefficients.

* * * * *